US006981406B2

(12) United States Patent  (10) Patent No.: US 6,981,406 B2
Willner  (45) Date of Patent: Jan. 3, 2006

(54) FIBER OPTIC CYLINDER PRESSURE MEASUREMENT SYSTEM FOR A COMBUSTION ENGINE

(75) Inventor: Christopher A Willner, Rochester, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 474 days.

(21) Appl. No.: 10/253,137

(22) Filed: Sep. 24, 2002

(65) Prior Publication Data

US 2004/0057645 A1   Mar. 25, 2004

(51) Int. Cl.
      *G01M 15/00*   (2006.01)
(52) U.S. Cl. ....................................................... 73/116
(58) Field of Classification Search .................. 73/116, 73/117.2, 117.3, 118.1, 115, 112
      See application file for complete search history.

(56) References Cited

U.S. PATENT DOCUMENTS

| | | | | |
|---|---|---|---|---|
| 4,932,263 | A | * | 6/1990 | Wlodarczyk .................. 73/705 |
| 5,714,680 | A | * | 2/1998 | Taylor et al. .................... 73/37 |
| 5,979,423 | A | * | 11/1999 | Poindexter et al. .......... 123/697 |
| 6,014,215 | A | * | 1/2000 | Kempen et al. .............. 356/479 |
| 6,301,957 | B1 | * | 10/2001 | Sakaguchi et al. ......... 73/117.3 |
| 6,622,549 | B1 | * | 9/2003 | Wlodarczyk et al. ...... 73/119 A |
| 6,680,472 | B1 | * | 1/2004 | Thingbø et al. ......... 250/227.12 |
| 6,778,279 | B2 | * | 8/2004 | Lange et al. ................. 356/483 |
| 2002/0154860 | A1 | * | 10/2002 | Fernald et al. ................ 385/37 |
| 2003/0169956 | A1 | * | 9/2003 | Lange et al. .................... 385/12 |
| 2004/0031326 | A1 | * | 2/2004 | Lenzing et al. ................ 73/800 |
| 2004/0083795 | A1 | * | 5/2004 | Butler et al. ................. 73/35.12 |
| 2004/0245441 | A1 | * | 12/2004 | Pieterse et al. ......... 250/227.14 |

FOREIGN PATENT DOCUMENTS

| | | |
|---|---|---|
| DE | 40 01 475 A1 | 7/1991 |
| DE | 41 03 327 A1 | 10/1992 |
| EP | 0 472 219 A2 | 2/1992 |

OTHER PUBLICATIONS

Multiplex in-cylinder pressure measurement utilizing an optical fiber with specific refractive-index composition, M. Komachiya et al., Applied Optics, vol. 35, No. 7, pp. 1143-1150 (Mar. 1, 1996).
In-Cylinder Fiber-Optic Pressure Sensors for Monitorying and Control of Diesel Engines, J. T. Wlodarczyk et al., http://www.optrand.com/Papers/sae98paper.htm.
Determination of Strain and Temperature Fields using Fiberoptic Bragg Grating Sensors, M. Trutzel et al., Sensor-Kongresse '99, at A8.4, (May 18-20, 1999).

* cited by examiner

*Primary Examiner*—Eric S. McCall
(74) *Attorney, Agent, or Firm*—Ralph E. Smith

(57) ABSTRACT

A measurement system is provided for a combustion engine. The measurement system employs a fiber optic cable optically coupled to a light source and has at least one Bragg grating. A second fiber optic cable is coupled to the first fiber optic cable in addition to a wavelength measurement device and a device for measuring intensity. A controller is coupled to the device for measuring intensity and the wavelength measurement device. Based upon the measurements from these devices, the controller determines the temperature and pressure in the combustion engine.

20 Claims, 3 Drawing Sheets

FIBER OPTIC CYLINDER PRESSURE MEASUREMENT SYSTEM FOR A COMBUSTION ENGINE

FIELD OF THE INVENTION

The present invention relates to sensor systems, and more specifically to a fiber optic measurement system for use with a combustion engine.

BACKGROUND OF THE INVENTION

The need for robust, high temperature, in-cylinder pressure measurement has long been a desired feature for the optimization of combustion engines. This is due primarily to the close correlation between instantaneous cylinder pressure and the efficiency of the combustion process. Combustion pressure, when detected in all cylinders, can provide the most deterministic information about engine performance. In order to implement the above strategies as well as fulfill future emissions and energy consumption requirements for vehicles, new types of combustion sensors will have to be developed.

Silicon micromachined sensor devices cannot withstand the harsh high temperature and chemically aggressive environments in modern engines (100° C. typical). Piezoelectric-quartz pressure transducers have been used for decades in engine development and calibration. However, they are generally not suited for implementation in production engines as they are susceptible to electromagnetic interference (EMI), tend to have a limited lifetime and are expensive. Lower cost piezoceramic devices, such as spark plug washers, do not typically offer the high accuracy under all engine operating conditions, are also subject to EMI interference and tend to have durability problems related to alloy separation, selective oxidation and diffusion when used in production engines. Other techniques, such as ionization probes, which measure flame propagation, usually do not provide as much useful information on the combustion process as do cylinder pressure measurements.

In contrast to electronic-based pressure sensing, fiber optic sensors are well suited to applications characterized by high temperatures and the high levels of EMI encountered in engines. Current techniques for using fiber optic sensors in engines employ either the microbend concept or use a Fabry-Perot modulator. The microbend concept generally requires extremely high pressures, greater than 3000 pounds/square inch, to achieve any kind of sensitivity and tends to be more complicated since this technique requires a sealed diaphragm, which is cost prohibitive and difficult to integrate into a production engine. Fabry-Perot cavities are generally exposed to the combustion chamber and not compatible with the high temperatures in this environment. In addition, they are end-mounted, intensity-based devices and as such require a separate fiber for each cylinder adding cost to the overall system.

Accordingly, a need exists for a simple, cost effective fiber optic measurement device which can withstand the harsh engine environment.

SUMMARY OF THE INVENTION

The present invention provides a measurement system for a combustion engine. The measurement system employs a fiber optic cable located within the engine and optically coupled to a light source. The first fiber optic cable also has at least one Bragg grating. A second fiber optic cable is coupled to the first fiber optic cable. The second fiber optic cable has a first end coupled to a wavelength measurement device and a second end coupled to a device for measuring intensity. The temperature and pressure of the engine cylinder modifies the Bragg grating spacing, resulting in an altered wavelength of the light signal reflected by the grating which is measured by the system. The device for measuring intensity and the wavelength measurement device are also coupled to a controller which uses the data from these devices to determine the temperature and pressure in the engine.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

The present invention is generally related to a fiber optic measurement system for an engine. In this regard, the fiber optic system will be described in the context of an internal combustion engine with four cylinders in an in-line configuration. However, it is to be understood that the principles embodied herein are equally applicable to other types of engines and engines in different configurations as well.

Figure 1:
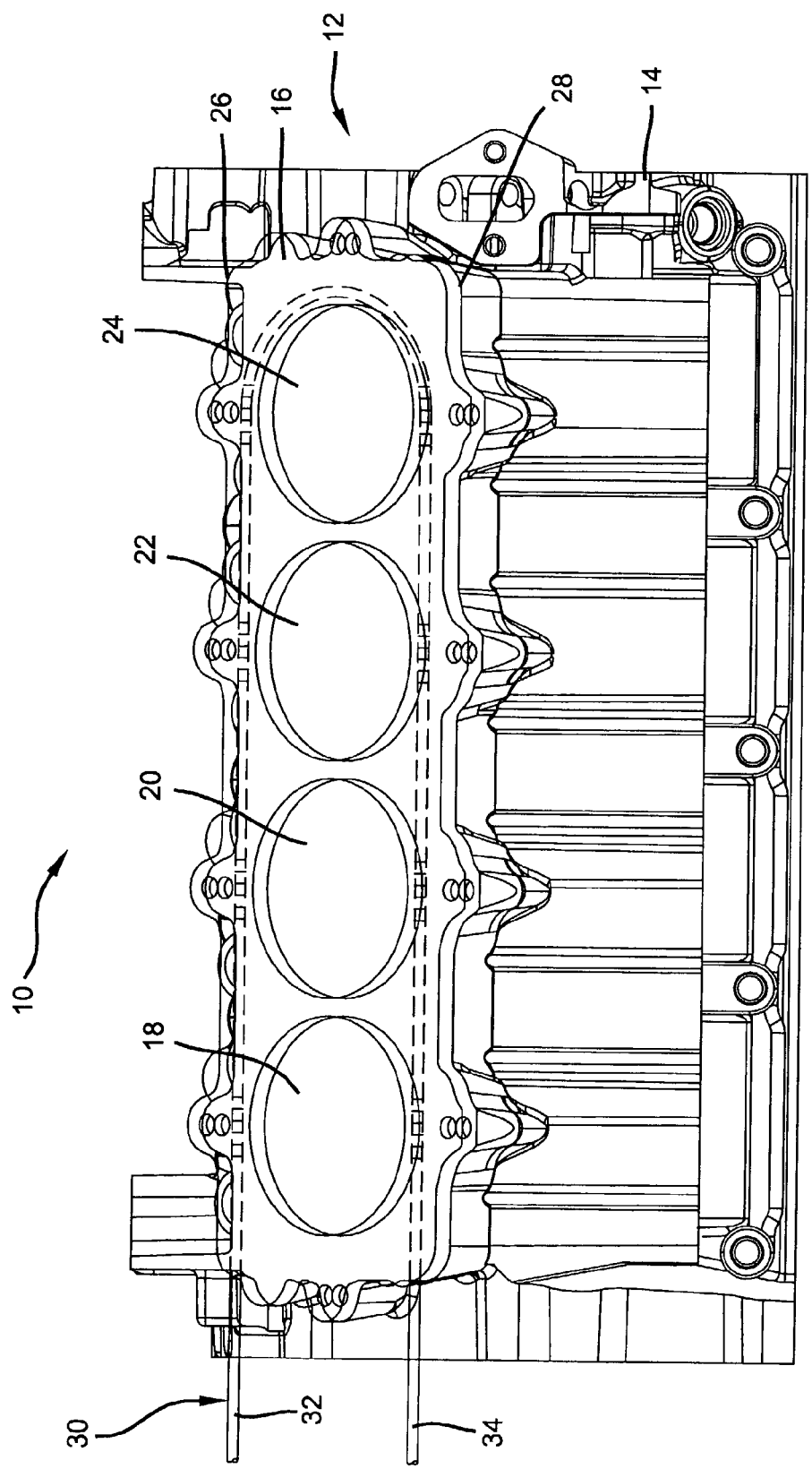
FIG. 1 is a perspective view of an engine according to the principles of the present invention.

Referring to FIG. 1, the present invention is directed to a fiber optic measurement system 10 for a internal combustion engine 12. The internal combustion engine 12 includes an engine block 14 and a head gasket 16. The head gasket 16 is fastened to the engine block 14 by bolts (not shown). The engine block 14 defines a first cylinder 18, a second cylinder 20, a third cylinder 22 and a fourth cylinder 24. The engine block 14 further has a first side 26 and a second side 28.

Figure 2:
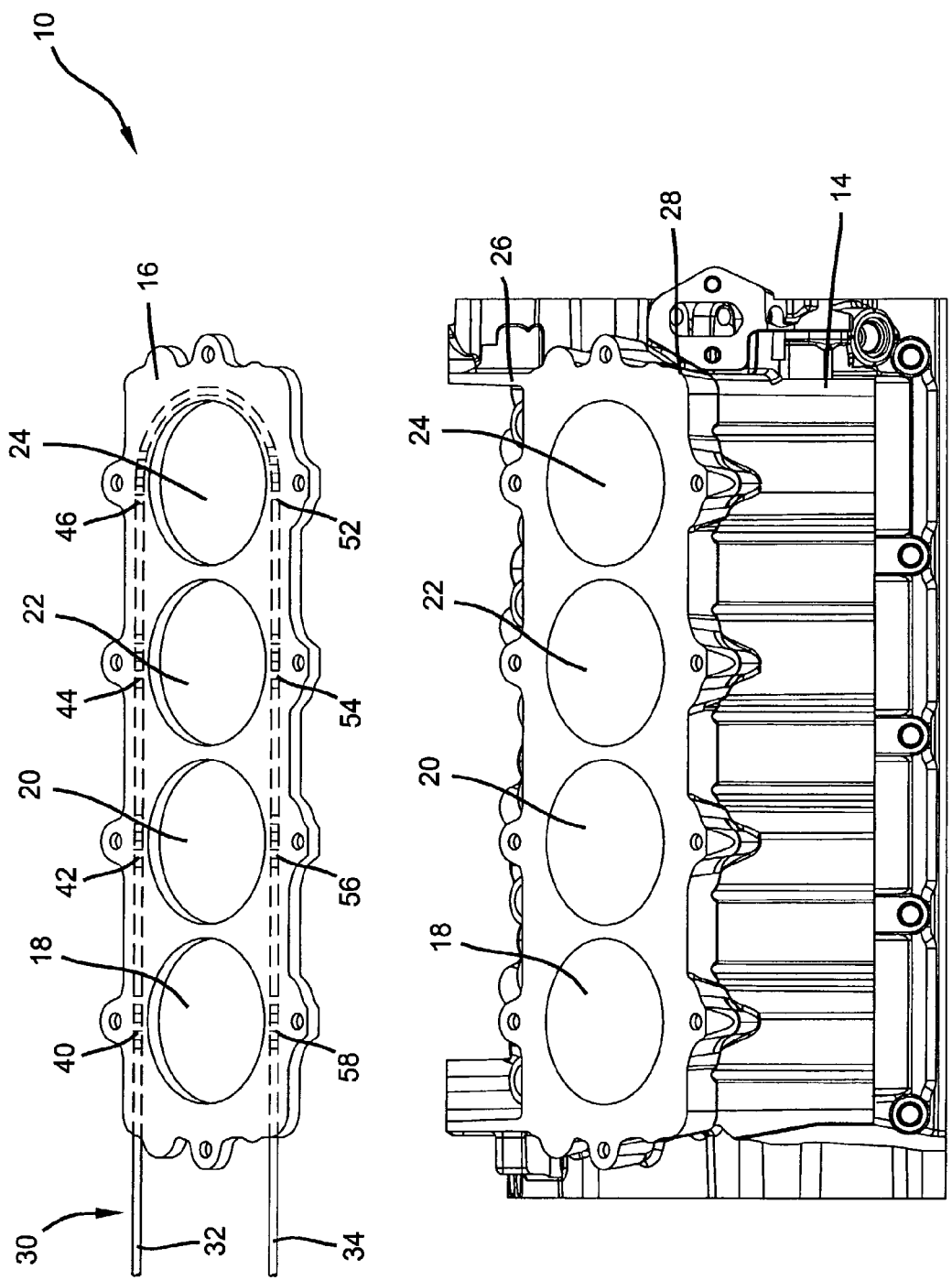
FIG. 2 is an exploded view of an engine according to the principles of the present invention.
Figure 3:
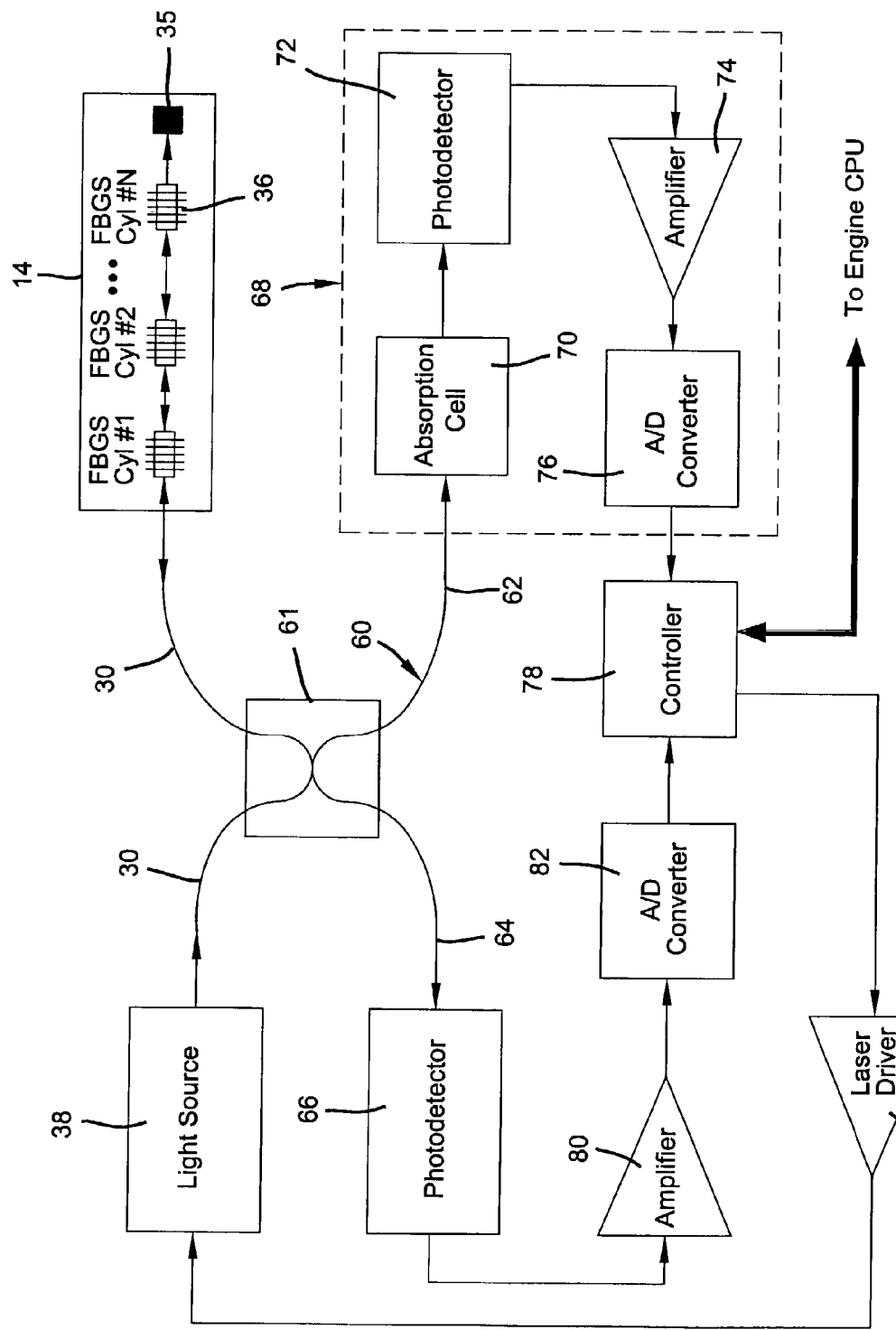
FIG. 3 is a schematic of a measurement system for an engine according to the principles of the present invention.

Now referring generally to FIGS. 1, 2 and 3, a first fiber optic cable 30 is disposed around the engine block 14, with a first end 32 starting at the first side 26 of the engine block 14, near the first cylinder 18. The first fiber optic cable 30 loops around the cylinders, 18, 20, 22, 24, with a second end 34 ending on the second side 28 of the engine block 14, near the first cylinder 18. The second end 34 further incorporates a light absorbing material 35, which acts as an energy dump to prevent additional reflections which would potentially interfere with the reflected signals from Bragg gratings. The first fiber optic cable 30 is shown as being embedded in the head gasket 16, however, other means could be used to dispose the first fiber optic cable 30 around the cylinders, 18, 20, 22, 24, such as, for example, embedding in the engine block 14 as a smart structure. A smart structure is a material or fabricated mechanical structure which has the ability to measure and continuously monitor external environmental changes, such as, for example, applied stresses, forces, thermal variations and adapt itself based upon these changes. The first fiber optic cable 30 is preferably single mode, cladded and silica based, however, different types of fiber optic cables can be used.

The first fiber optic cable 30 has a set of distributed, periodic Bragg gratings 36. The Bragg gratings 36 can be formed on the first fiber optic cable 30 by any method known in the art. The Bragg gratings 36 are produced by an interference pattern of ultraviolet light which results in a permanent modulation of the refractive index. Hence, when the Bragg gratings 36 are exposed to optical radiation from a light source 38, the light energy is reflected by each of the Bragg gratings 36 at a corresponding Bragg wavelength given by, $\lambda_B^N = 2 \cdot n_{eff} \cdot \Lambda$, wherein, $\lambda_B$ denotes the Bragg wavelength, $n_{eff}$ is the effective refractive index of the fiber optic, $\Lambda$ is the period of the grating and N denotes the particular grating or cylinder at which the grating is located. Both the effective refractive index, $n_{eff}$, and the period of the grating, $\Lambda$, are functions of temperature and pressure. Thus, external forces such as compression or tensile stress on the Bragg gratings 36 leads to changes in the period $\Lambda$ of the Bragg gratings 36. Hence, the relative shift of the Bragg wavelength of the reflected energy for a force or strain applied axially or transverse to the first fiber optic cable 30, $\epsilon_Z$ is, in a first approximation, given as, $$\frac{\Delta \lambda}{\lambda} = C_\epsilon \cdot \epsilon_Z + C_T \cdot \Delta T,$$

wherein, $C_\epsilon$ and $C_T$ are material constants determined from calibration experiments. Typical values for the relative Bragg shift are approximately ten picometers/Kelvin due to temperature, and approximately 1.2 picometers/microstrain, wherein one microstrain equals one micrometer/meter. Based upon this knowledge, the Bragg gratings 36 function to measure the strain and temperature at each cylinder 18, 20, 22, 24 which correlates to the pressure in each cylinder, 18, 20, 22, 24, of the engine block 14.

The Bragg gratings 36 are shown as placed on opposing ends of the diameter of each cylinder, 18, 20, 22, 24, although any location near the desired cylinder would product a similar response. A first Bragg grating 40 is located at the first cylinder 18. Next, a second Bragg grating 42 is placed at the second cylinder 20, a third Bragg grating 44 at the third cylinder 22 and a fourth Bragg grating 46 at the fourth cylinder 24. In addition, a set of redundant gratings are placed on the first fiber optic cable 30 such that the set of redundant gratings are located on the second side 28 of the engine block 14. The set of redundant gratings act to improve accuracy and reliability of the temperature and strain measurements by allowing simultaneous measurements to yield multiple sets of data points for each cylinder. The multiple readings can then be averaged to obtain a more accurate reading of the temperature and strain. The set of redundant Bragg gratings include a fifth Bragg grating 52 at the fourth cylinder 24, a sixth Bragg grating 54 at the third cylinder 22, a seventh Bragg grating 56 at the second cylinder 20 and an eight Bragg grating 58 at the first cylinder 18. Each of the Bragg gratings 36 has a slightly different spacing or period, such that when excited by an infrared or visible light source, different reflected wavelengths are produced. Thus, the separate Bragg gratings 40, 42, 44, 46, 52, 54, 56, 58 can be read out on a single carrier fiber using wavelength division multiplexing. Alternatively, the timing information from the internal combustion engine 12 may also be used to produce the desired sensor multiplexing using time-domain techniques.

Referring now to FIG. 3, coupled to the first end 32 of the first fiber optic cable 30 is a light source 38. The light source 38 is any device capable of exciting the first fiber optic cable 30, such as, for example, tunable laser, LED, laser diode or other quasi-monochromatic source which can be scanned through a range of wavelengths, typically 1400 to 1500 nanometers. The light source 38 needs be tunable so that it is capable of scanning over a range of wavelengths in order to read out each grating on the first fiber optic cable 30. In particular, the light source 38 needs to scan through the entire wavelength range within a time reasonable to capture or sample enough data points to accurately represent the temporal behavior of the combustion process in each cylinder. For example, at an engine running at 5000 revolutions per minute, this requires about 85 samples per second or 85 Hertz per cylinder for an eight cylinder engine and, since each cylinder needs to be sampled at this rate, approximately one kiloHertz is the required sampling rate.

The light source 38 excites the first fiber optic cable 30 by emitting continuous quasi-monochromatic optical radiation which is currently scanned at a rate, $d\lambda/dt$ which is reflected by each Bragg grating 36 at a Bragg wavelength $\lambda_B^N$. Specifically, the light source 38 excites the sensor network at around 1450 nanometers wavelength with ±25 nanometers line width for a diode-pumped, external cavity source. The light source 38 may include an external cavity laser which is pumped by a laser diode which allows for a scan range of 1400 to 1500 nanometers. Alternatively, a broadband LED with a relatively large line width, $\Delta \lambda$ or AlGaAs semiconductor laser diode at approximately 850 nanometers could be employed. A source driver circuit 39 is coupled to the light source 38 to provide a precise, constant current of several amps which is generally required. This driver circuit must be stable over temperature in order to achieve optimum, repeatable optical intensity and wavelength control.

A second fiber optic cable 60 is coupled to the first fiber optic cable 30 by a nominal 50:50 bi-directional fiber optic coupler 61. The first fiber optic cable 30 is used to guide the optical energy from the light source 38 into the Bragg gratings 36. The second fiber optic cable 60 couples, or taps off, a percentage of this energy, nominally 50%, in both directions of light propagation. The second fiber optic cable 60 has a first end 62 and a second end 64. The Bragg reflections are transmitted via the second end 64 of the second fiber optic cable 60 to a first photodetector 66. The light from the light source 38 is transmitted via the first end 62 of the second fiber optic cable 60 to a wavelength measurement system 68.

Coupled to the first end 62 of the second fiber optic cable 60 is the wavelength measurement system 68. The wavelength measurement system 68 can include any device capable of measuring the wavelength of the light source 38 such as, for example, an absorption cell 70 coupled to a second photodetector 72. The absorption cell 70 includes a material with a known response to wavelengths, or known spectral curve. Alternatively, a Fabry-Perot cavity, a monochromator, a prism or a fiber ring interferometer could also be used to characterize the source wavelength. The spectral response from the absorption cell 70 is sent to the second photodetector 72.

The second photodetector 72 can be any device which functions to measure the intensity of a wavelength, such as, for example, a photodiode. The second photodetector 72 measures the intensity of the wavelength from the light source 38 and sends this signal to a signal conditioning amplifier 74.

The signal conditioning amplifier 74 is a low-noise amplifier which performs a current-to-voltage conversion according to, $$V_{PD} = A_V i_{PD} R_{AMP} = \frac{\eta \lambda e P_{OPTICAL} A_V R_{AMP}}{hc}$$

where, $A_V$ is the voltage gain of the amplifier, $R_{AMP}$ is its input impedance, $\eta$ is the quantum efficiency, $\lambda$ is the wavelength of the Bragg grating signal, $P_{OPTICAL}$ is the optical power of the grating signal, e is the electronic charge, c is the speed of light in the fiber, and h is Planck's constant. The signal conditioning amplifier presents an accurate voltage to an Analog-to-Digital (A/D) converter 76.

After the signal is processed by the signal conditioning amplifier 74, the signal enters the A/D converter 76 with which has nominally 12-bit digital resolution and converts the analog signal to a digital format. The A/D converter 76 is further coupled to a controller 78. The A/D converter 76 converts the analog signal from the signal conditioning amplifier 74 to a digital signal which is compatible with the controller 78. The resultant signal, when compared to the known absorption cell response curve, is used to determine the wavelength at which the source is emitting and thus normalizes the FBG grating reflections (onto which both temperature and combustion pressure are encoded) as obtained as below.

The second end 64 of the second fiber optic cable 60 communicates with the first photodetector 66. The first photodetector 66 receives the optical Bragg grating signals from the first fiber optic cable 30 via the fiber optic coupler 61. The first photodetector 66 measures all the reflected energy coupled into the second fiber optic cable 60 by reflections from the fiber Bragg grating sensors 36. The first photodetector 66 is coupled to a signal conditioning amplifier 80 which presents an accurate voltage to an A/D converter 82. The A/D converter 82 is coupled to the controller 78.

The controller 78 is coupled to both the wavelength measurement system 68 and the A/D converter 82. The controller 78 scans the optical source and reads the intensity response from the first photodetector 66 after its conversion by the A/D converter 82. The controller 78 then compares these readings to the same readings taken at room temperature without the combustion process occurring and calculates the difference between the two readings. Hence, the controller 78 separates the temperature and pressure readings via the above calibration under different ambient conditions to determine the actual first order sensitivity coefficients. The measured cylinder pressure values are then converted into integrated mean pressures for each cylinder, 18, 20, 22, 24 and the information is then sent to the engine control central processing unit (not shown) via a digital serial bus such as a CAN bus or RS-232. Alternatively, a thermocouple or an appropriate temperature sensor can be combined with the system to assist in the determination of the cylinder temperature.

The advanced techniques of multiplexing individual devices on a single fiber reduces system topology, wiring and connector costs and the associated reliability issues. These benefits combined with exceptional durability and low cost, make fiber-optic sensors the best candidates for their use in high volume production of combustion engines. In addition, temperatures in excess of 300° C. are common for the engine block environment and silica fibers can withstand up to 800° C. Fiber optic systems also have essentially no susceptibility to EMI, and extremely high bandwidth for signal transmission.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for measuring at least one operating parameter of an internal combustion engine comprising:
    a first fiber optic cable carrying a Bragg grating located at a predetermined position within the engine and having a light absorbing material in a terminal end thereof;
    a light source optically coupled to a first end of the first fiber optic cable;
    a second fiber optic cable optically coupled to the first fiber optic cable;
    a device for measuring optical wavelength coupled to a first end of the second fiber optic cable;
    a device for measuring light intensity coupled to a second end of the second fiber optic cable; and
    a controller coupled to the device for measuring light intensity and the device for measuring wavelength and operative to generate a signal indicative of the at least one operating parameter in response to signals generated by the devices for measuring.

2. The system of claim 1 wherein said device for measuring light intensity is a silicon photodiode.

3. The system of claim 2 wherein said device for measuring light intensity is optically coupled to a signal conditioning amplifier.

4. The system of claim 3 wherein said signal conditioning amplifier is optically coupled to a device for converting an analog signal into a digital format.

5. The system of claim 4 wherein said device for converting is optically coupled to said controller.

6. The system of claim 1 wherein said device for measuring optical wavelength is optically coupled to a signal conditioning amplifier.

7. The system of claim 6 wherein said signal conditioning amplifier is optically coupled to a device for converting signals from analog to digital.

8. The system of claim 7 wherein said device for converting signals is optically coupled to said controller.

9. The system of claim 1 wherein said light source is coupled to a device far providing constant current.

10. The system of claim 9 wherein said device for providing constant current is in communication with said controller.

11. The system of claim 1 wherein said controller transmits said signal indicative of the at least one operating parameter to a computer.

12. The system of claim 1 wherein said engine has a head gasket configured to receive said first fiber optic cable.

13. The system of claim 1 wherein said engine has an engine block and said first fiber optic cable is embedded in said engine block.

14. The system of claim 13 wherein the engine brook includes at least one cylinder and the first fiber optic cable is positioned with respect to the at least one cylinder such that a first and a second Bragg grating carried by the first fiber optic cable are located respectively at opposite ends of a diameter of the at least one cylinder.

15. The system of claim 1 wherein said first fiber optic cable is coupled to said second fiber optic cable by a 50:50 coupler.

16. A method for measuring at least one parameter of an engine comprising:
    transmitting an optical pulse through a first fiber optic cable having at least one Bragg grating;
    creating a Bragg wavelength from said optical pulse with said Bragg grating;
    transmitting said Bragg wavelength into a second fiber optic cable;
    detecting a wavelength of the Bragg wavelength and converting said wave length into a first signal;
    detecting light intensity of said Bragg wavelength and converting said light intensity into a second signal; and
    calculating the at least one engine parameter based on said first and second signals.

17. The method of claim 16 further including:
    amplifying said second signal; and
    converting said second signal from analog to digital form.

18. The method of claim 17 further including comparing said digital form signal to a table of known values to determine the at least one engine parameter.

19. A system for measuring at least one operating parameter of an internal combustion engine comprising:
    a first fiber optic cable carrying a Bragg grating located at a predetermined position within the engine;
    a light source optically coupled to a first end of the first fiber optic cable;
    a second fiber optic cable optically coupled to the first fiber optic cable;
    a device for measuring optical wavelength coupled to a first end of the second fiber optic cable, wherein the device for measuring optical wavelength is at least one of a Fabry-Perot cavity, absorption cell, fiber ring interferometer, monochromotor or prism;
    a device for measuring light intensity coupled to a second end of the second fiber optic cable; and
    a controller coupled to the device for measuring light intensity and the device for measuring wavelength and operative to generate a signal Indicative of the at least one operating parameter in response to signals generated by the devices for measuring.

20. A system for measuring at least one of temperature and pressure of an internal combustion engine comprising:
    a first fiber optic cable carrying a Bragg grating located at a predetermined position within the engine and configured to measure temperature and pressure;
    a light source optically coupled to a first end of the first fiber optic cable;
    a second fiber optic cable optically coupled to the first fiber optic cable;
    a device for measuring optical wavelength coupled to a first end of the second fiber optic cable;
    a device for measuring light intensity coupled to a second end of the second fiber optic cable; and
    a controller coupled to the device for measuring light intensity and the device far measuring wavelength and operative to generate a signal indicative of the temperature and pressure in response to signals generated by the devices for measuring.

* * * * *